(12) United States Patent
Roither

(10) Patent No.: US 6,452,293 B1
(45) Date of Patent: Sep. 17, 2002

(54) LINEAR DRIVE

(75) Inventor: Andreas Roither, Bielefeld (DE)

(73) Assignee: Dewert Antriebs- und Systemtechnik GmbH & Co. KG, Kirchlengern (DE)

( * ) Notice: Subject to any disclaimer, the term of this patent is extended or adjusted under 35 U.S.C. 154(b) by 0 days.

(21) Appl. No.: 09/636,713

(22) Filed: Aug. 11, 2000

(30) Foreign Application Priority Data

Aug. 12, 1999 (DE) ..................... 299 14 126 U

(51) Int. Cl.$^7$ ................. H02K 7/06; H02K 41/00
(52) U.S. Cl. ................................. 310/12; 310/20
(58) Field of Search .................. 310/20, 37, 80, 310/750, 83, 96, 99

(56) References Cited

U.S. PATENT DOCUMENTS

| | | | | |
|---|---|---|---|---|
| 4,628,459 A | * | 12/1986 | Shinohara et al. | 364/475 |
| 4,989,323 A | * | 2/1991 | Casper et al. | 30/296.1 |
| 5,233,247 A | * | 8/1993 | Stark | 310/83 |
| 5,593,380 A | * | 1/1997 | Bittikofer | 601/27 |
| 5,791,622 A | * | 8/1998 | Gauger | 248/430 |
| 5,820,464 A | * | 10/1998 | Parlato | 464/58 |
| 6,118,195 A | * | 9/2000 | Hauer | 310/75 R |
| 6,267,679 B1 | * | 7/2001 | Romana | 464/58 |

\* cited by examiner

Primary Examiner—Nestor Ramirez
Assistant Examiner—Judson H. Jones
(74) Attorney, Agent, or Firm—Henry M. Feiereisen

(57) ABSTRACT

A linear drive, useful in particular as drive for a piece of furniture, includes at least one spindle, and a drive mechanism, having a drive motor and a reduction gear in driving relationship with the drive motor, for rotatably driving the spindle. The drive mechanism is provided with a drive element having an input member and an output member, with the input member selectively adjustable with respect to the output member.

30 Claims, 6 Drawing Sheets

LINEAR DRIVE

CROSS-REFERENCES TO RELATED APPLICATIONS

This application claims the priority of German Patent Application, Serial No. 299 14 126.8, filed Aug. 12, 1999, the subject matter of which is incorporated herein by reference.

BACKGROUND OF THE INVENTION

The present invention relates, in general, to a linear drive, and more particularly to a linear drive of a type having a spindle, and a drive mechanism, including a drive motor and a reduction gear in driving relationship with the drive motor, for rotatably driving the spindle.

Linear drives of this type are typically employed for adjusting a position of components of pieces of furniture. Thus, the power output of such linear drives is relatively low. The drive motor is normally a d.c. motor with applied safety voltage. The reduction gear significantly decreases the revolution of the spindle with respect to the motor shaft. Moreover, the linear drive has a casing. When the spindle rotates, a spindle nut, placed on the spindle in fixed rotative engagement, travels linearly to operate the attached component of the piece of furniture via a lever or similar part.

Typically, linear drives, involved here, are single drives with one drive motor, a reduction gear and a spindle, or dual drives with two drive motors and two reduction gears as well as two spindles, with each drive motor being individually activated. Thus, each drive mechanism is comprised of the drive motor, the reduction gear and the spindle, whereby the reduction gear is normally a worm gear, with the worm placed directly on the output pin of the drive motor. Thus, the motor shaft extends at a right angle to the spindle. As a consequence, the linear drive can be installed in specific space configuration only, and is thus not universally applicable.

Linear drives are also known having a motor shaft in driving relation with the spindle via bevel wheels. Such drives are, however, unsuitable for use as drives for pieces of furniture because the speed ratio of the motor shaft in relation to the spindle is fairly small, so that the spindle nut would run way too fast.

SUMMARY OF THE INVENTION

It is thus an object of the present invention to provide an improved linear drive, obviating the afore-stated drawbacks.

In particular, it is an object of the present invention to provide an improved linear drive which is simple in structure and compact while yet running quietly and reliably in operation.

It is another object of the present invention to provide an improved linear drive which allows a disposition of a drive motor in any desired manner with respect to the spindle.

These objects, and others which will become apparent hereinafter, are attained in accordance with the present invention by providing at least one spindle, and a drive mechanism, including a drive motor and a reduction gear in driving relationship with the drive motor, for rotatably driving the spindle, with the drive mechanism having a drive element having an input member and an output member, whereby the input member is selectively adjustable with respect to the output member.

In accordance with the present invention, the drive mechanism is expanded by the adjustable drive element. The position of the input element with respect to the output member depends on the installation conditions at hand. Although a perpendicular disposition of the motor shaft with respect to the spindle is basically possible, the distance of the drive motor to the spindle can be greatly modified, so that other configurations of the drive motor with respect to the spindle are now feasible as well, e.g. a non-perpendicular disposition. It is also possible to disengage the drive motor from the remaining components so that the drive motor can be mounted at a free location. This is advantageous in particular in narrow or tight spaces of installation, as the adjustable drive element permits installation of the drive motor at any suitable location. The drive element with an adjustment option of the output member with respect to the input element, or vice versa, is normally so configured that the transmitted torque is relative small and sufficient to adjust components of a piece of furniture, e.g. slatted frames, components of a chair or the like. As the linear drive is so mounted to a piece of furniture that its components are invisible, the provision of the additional drive element does not increase a risk of accident. A need for a particular protection is thus not necessary and the linear drive operates extremely quiet.

According to another feature of the present invention, the input member of the drive element is infinitely variable with respect to the output member within an adjustment range. In this way, the drive motor can be positioned in any disposition to the spindle. Suitable, the drive element is a strand-like, flexible element, or includes at least a joint, e.g. a ball-and-socket joint or a universal joint. A strand-like drive element may, for example, be implemented by a flexible shaft, whereas for the application of a joint, the use of a cardan shaft or an articulated shaft are conceivable. In the event the drive element has several spaced-apart joints, the entire deflection angle may be relatively great. It is, however, also feasible to provide the drive mechanism with at least two different drive elements, e.g. one or more strand-like, flexible drive elements and one or more ball-and-socket joints or cardan joints, so that any suitable combination can be used and best suited to the installation conditions at hand.

Suitably, the drive motor and the reduction gear are coupled in driving relationship by the adjustable drive element. This configuration is advantageous because a smallest torque can be transmitted whereas at a linkage, for example between the reduction gear and the spindle, that is basically possible, the drive element can transmit a respectively high torque.

The drive motor can be randomly located. It is therefore possible, that the drive motor has a rotor destined from rotation about a rotation axis which extends in parallel relation at a distance to a rotation axis of the spindle. The spindle is fitted in a so-called flanged tube which is securely fixed to the casing, so that the drive motor may be mounted on the outside directly upon the flanged tube. Depending on the option of installing the linear drive in free spaces of a piece of furniture, the rotation axis of the rotor of the drive motor may also extend at slanted disposition to the rotation axis of the spindle. Suitable, the spindle and the motor shaft define hereby an acute angle. It is also possible, to secure the drive motor by a bracket which is mounted to the casing or to the flanged tube.

According to another feature of the present invention, the reduction gear may be a worm gear having a worm coupled to the drive element. In this manner, a relatively great speed ratio of the drive motor to the spindle can be realized.

When employing the linear drive as drive for a piece of furniture, the attached component of the piece of furniture is operated by the linear drive for moving the component and thus the piece of furniture in up and down directions. Situations are, however, conceivable, when the down movement is implemented at a greater speed as a result of the own weight. In this case, the linear drive should be configured with a release clutch for coupling the drive element with the drive motor so that the linear drive can be disengaged.

According to another feature of the present invention, the drive element may be formed by a plurality of windings wound from a wire. In this manner, the drive element can be shaped or deformed to suit any situation at hand and is easy to manufacture. An alternative that permits an increase of the torque being transmitted includes the fabrication of a strand-like, flexible drive element from several layers which are nested within one another and made from windings of different diameter. As a consequence, the wall thickness of the drive element is increased.

The use of a drive element with an input member that is adjustable with respect to the output member permits further options. For example, several linear drives of conventional design may be united to a drive assembly, with the gear mechanism of each linear drive driven by the drive element via a transfer case. It is then possible, to use a single motor to drive several linear drives, whereby a transfer case is disposed between the motor and the linear drives. Another variation includes the use of two or more transfer cases that are driven by a single motor, wherein the drive elements of the linear motors are connected to the output elements of the transfer cases.

Suitably, the drive motor is activated by a hand switch via a control unit which is operatively connected to the hand switch. It may also be conceivable to so configure the transfer cases that only selected linear drives are operated when the drive motor is switched on.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
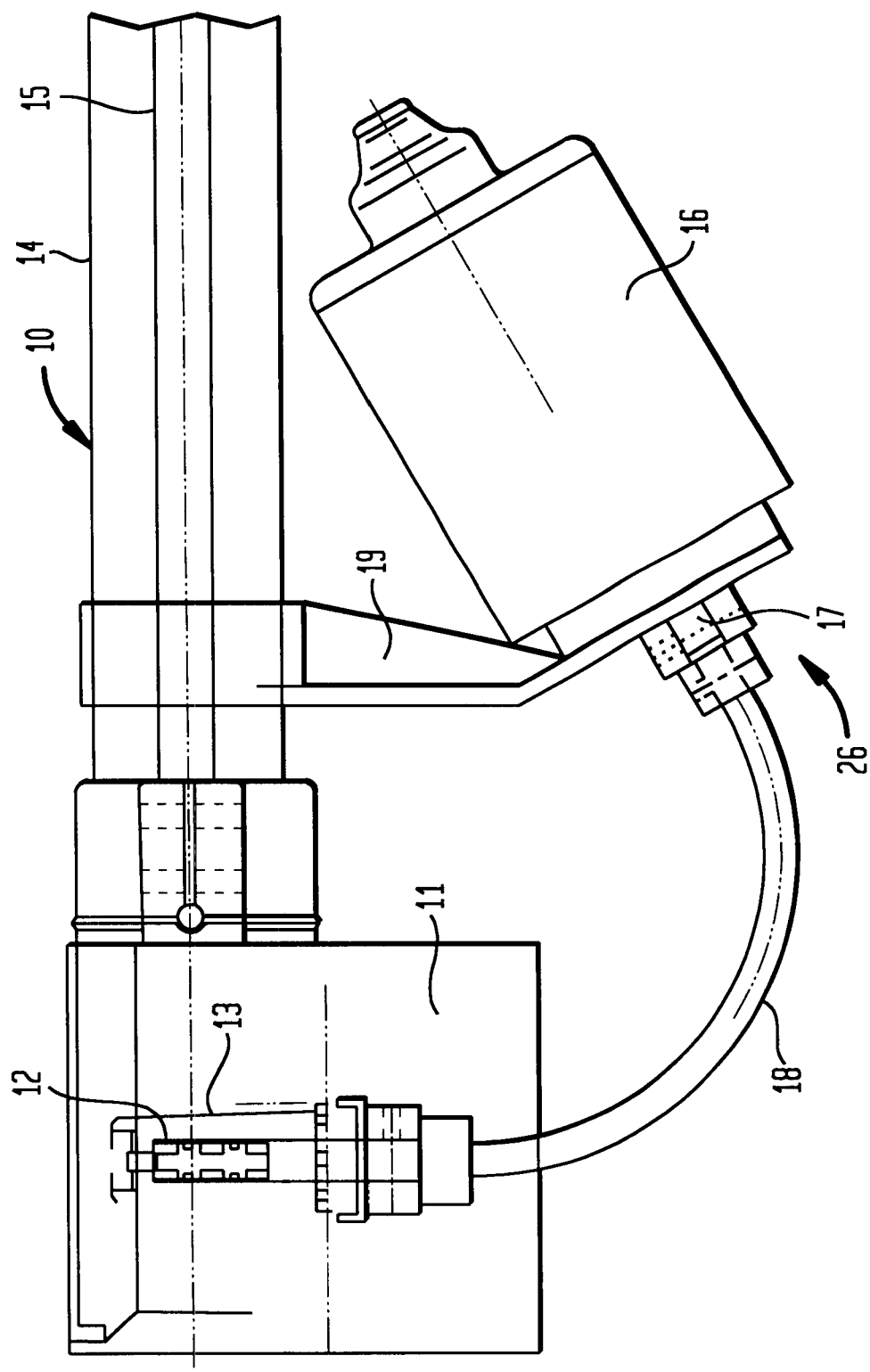
FIG. 1 is a schematic illustration of one embodiment of a linear drive according to the present invention.

Throughout all the Figures, same or corresponding elements are generally indicated by same reference numerals.

Figure 8:
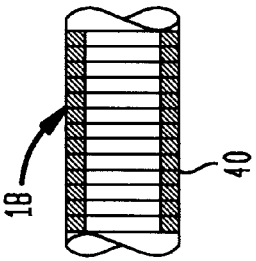
FIG. 8 is a detailed view of a drive element.

Turning now to the drawing, and in particular to FIG. 1, there is shown a schematic illustration of one embodiment of a linear drive according to the present invention, generally designated by reference numeral 10, and useful in particular as a drive for a piece of furniture. The linear drive has a casing 11 which accommodates a worm gear mechanism comprised of a worm 12 and a worm gear 13 in mesh with the worm 12. Projecting out from and mounted to the casing 11 is a flanged tube 14 which has fitted therein a spindle 15. A spindle nut is placed on the spindle 15 but has not been shown in detail for sake of simplicity. The worm 12 is driven by a drive motor 16 having an output pin 17 which is operatively connected via a suitable coupling, generally designated by reference numeral 26, to an input end of a flexible, strand-like drive element 18. The other output end of the flexible drive element 18 is operatively connected to the worm 12. Suitably, the strand-like, flexible drive element 18 is formed by a plurality of windings wound from a wire 40, as shown in FIG. 8, or the strand-like, flexible drive element 18 is formed from several layers nested within one another and made from windings of different diameter.

The drive motor 16 is secured in place by a bracket 19 which is fitted over the flanged tube 14 and so configured that the rotation axis of the drive motor 16 extends obliquely to the rotation axis of the spindle 15. In the nonlimiting example of FIG. 1, the angle between the rotation axis of the drive motor 16 and the rotation axis of the spindle 15 is about 45°. Of course, this configuration is shown by way of example only, and other angular dispositions are certainly within the scope of the present invention.

Figure 2:
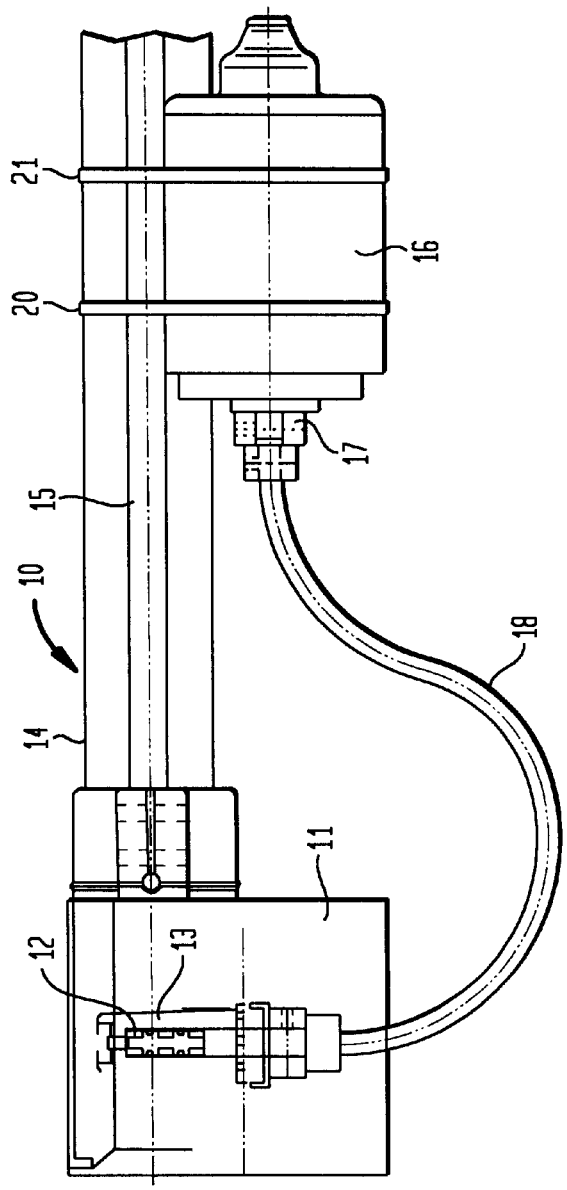
FIG. 2 is a schematic illustration of another embodiment of a linear drive according to the present invention.
Figure 3:
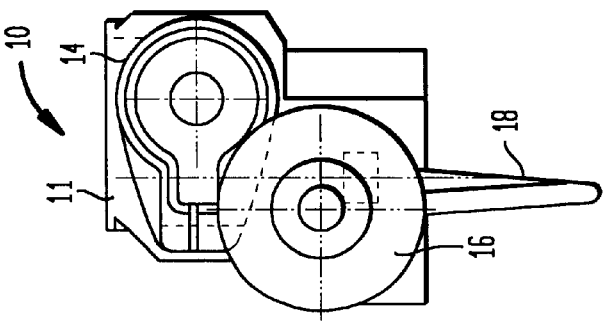
FIG. 3 is a side view of the linear drive of FIG. 2.

FIG. 2 shows a variation of the linear drive 10 according to the present invention. Parts corresponding with those in FIG. 1 are denoted by identical reference numerals and not explained again. In this embodiment, provision is made to dispose the rotation axis of the drive motor 16 in parallel, spaced-apart relation to the rotation axis of the spindle 15, as also indicated in FIG. 3. The drive motor 16 is hereby mounted to the flanged tube 14 by two straps 20, 21. Suitably, the distance between the casing 11 and the drive motor 16 is greater compared to the embodiment of FIG. 1 in order to prevent an excessive flexure of the drive element 18.

FIGS. 1 and 2 show embodiments of the linear drive 10 as so-called single drive with one drive motor 16 and one spindle 15. Of course, it is certainly within the scope of the present invention to configure the linear drive as dual drive with two drive motors, two reduction gears and two spindles. It will also be understood by persons skilled in the art that the drive motor may be entirely detached from the flanged tube 14 and mounted at a suitable location of a component of the piece of furniture that is to be adjusted in position.

Figure 5:
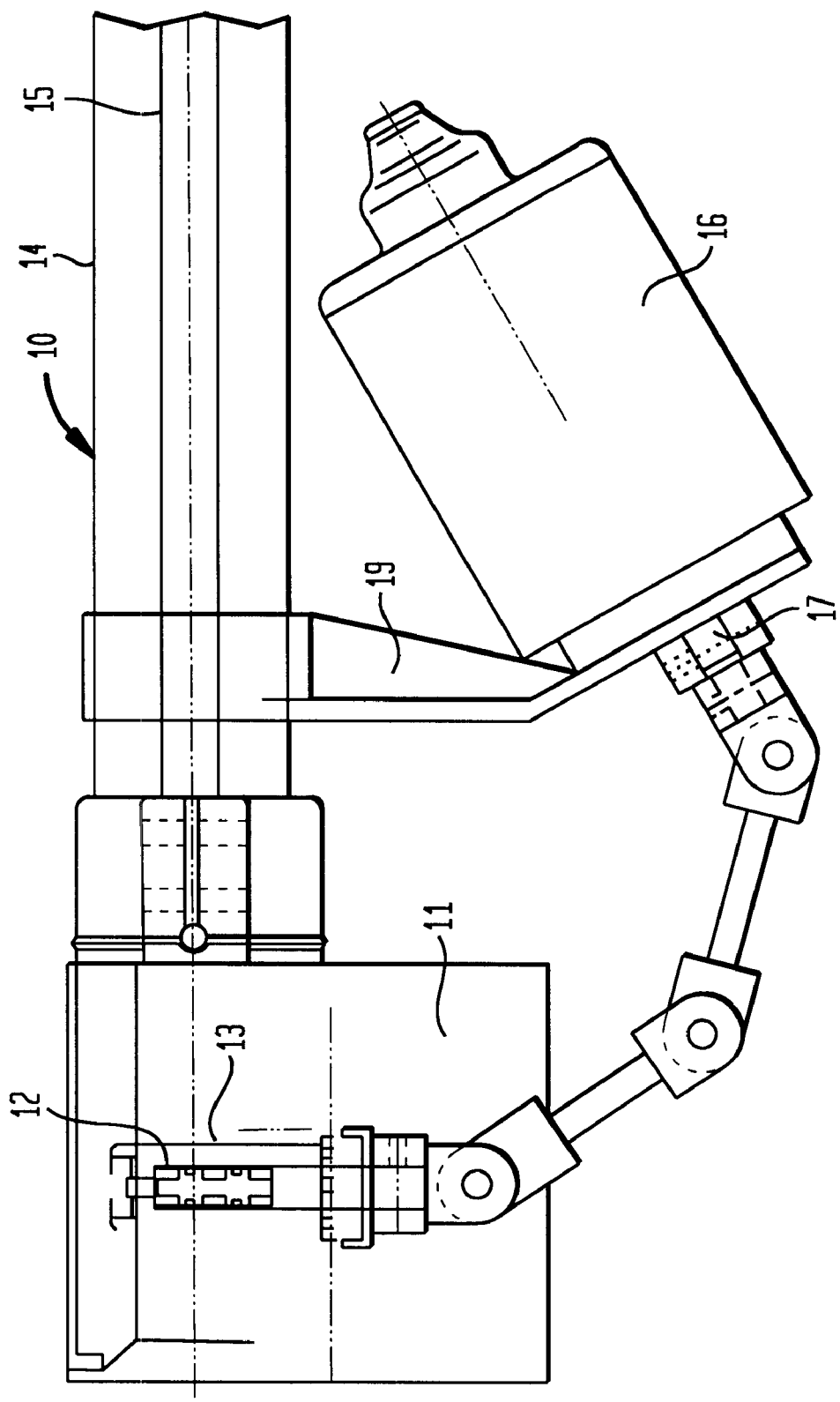
FIG. 5 is a schematic illustration of still another embodiment of a linear drive according to the present invention.
Figure 6:
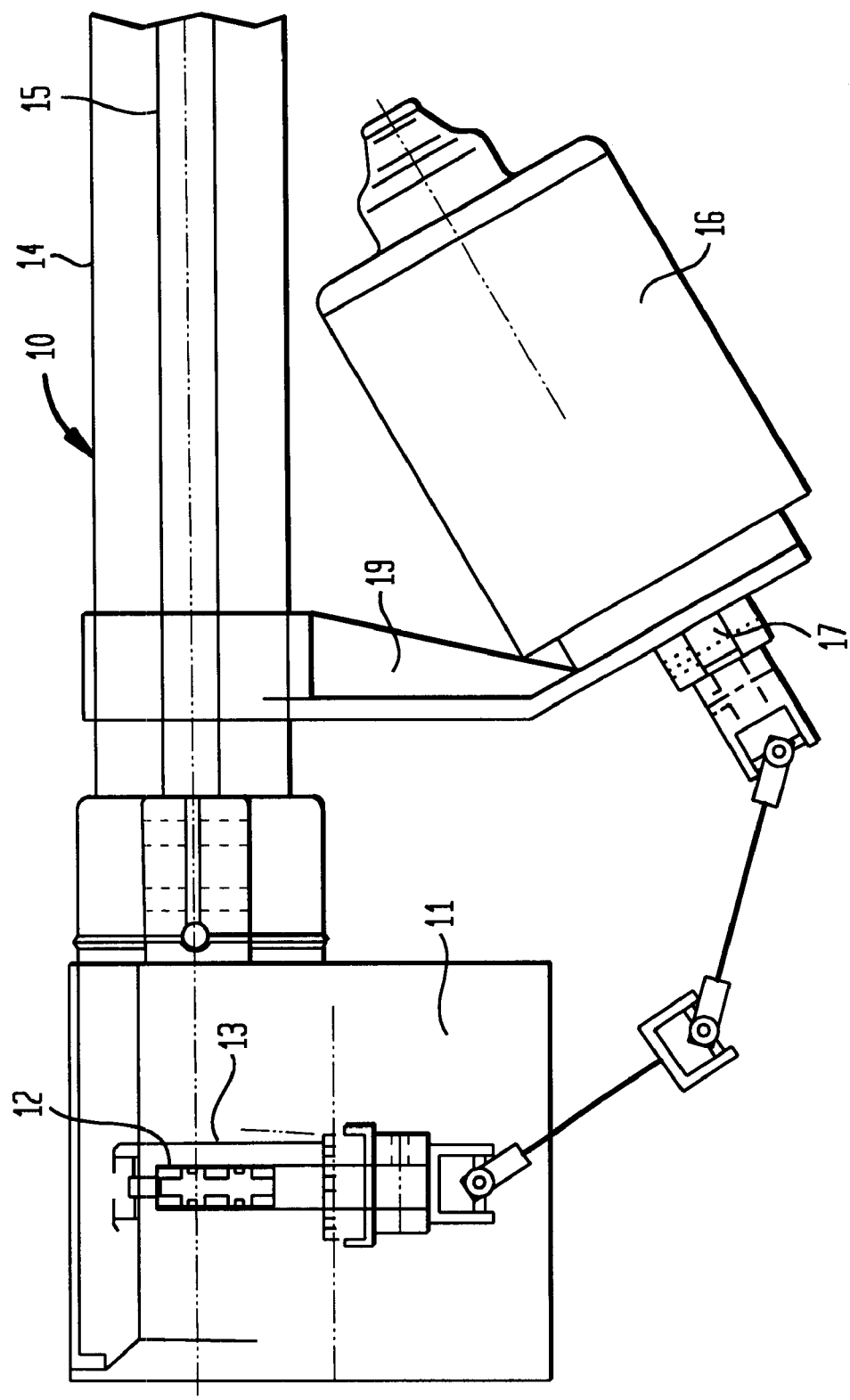
FIG. 6 is a schematic illustration of still another embodiment of a linear drive according to the present invention.

As an alternative to the flexible, strand-like configuration of the drive element 18, as shown in FIGS. 1 to 3, the drive element may comprise one or more joints, such as ball-and-socket joints, as shown in FIG. 5, or universal joints, as shown in FIG. 6, to impart the desired flexibility. Such elements may be denoted as cardan shafts or articulated shafts.

Figure 4:
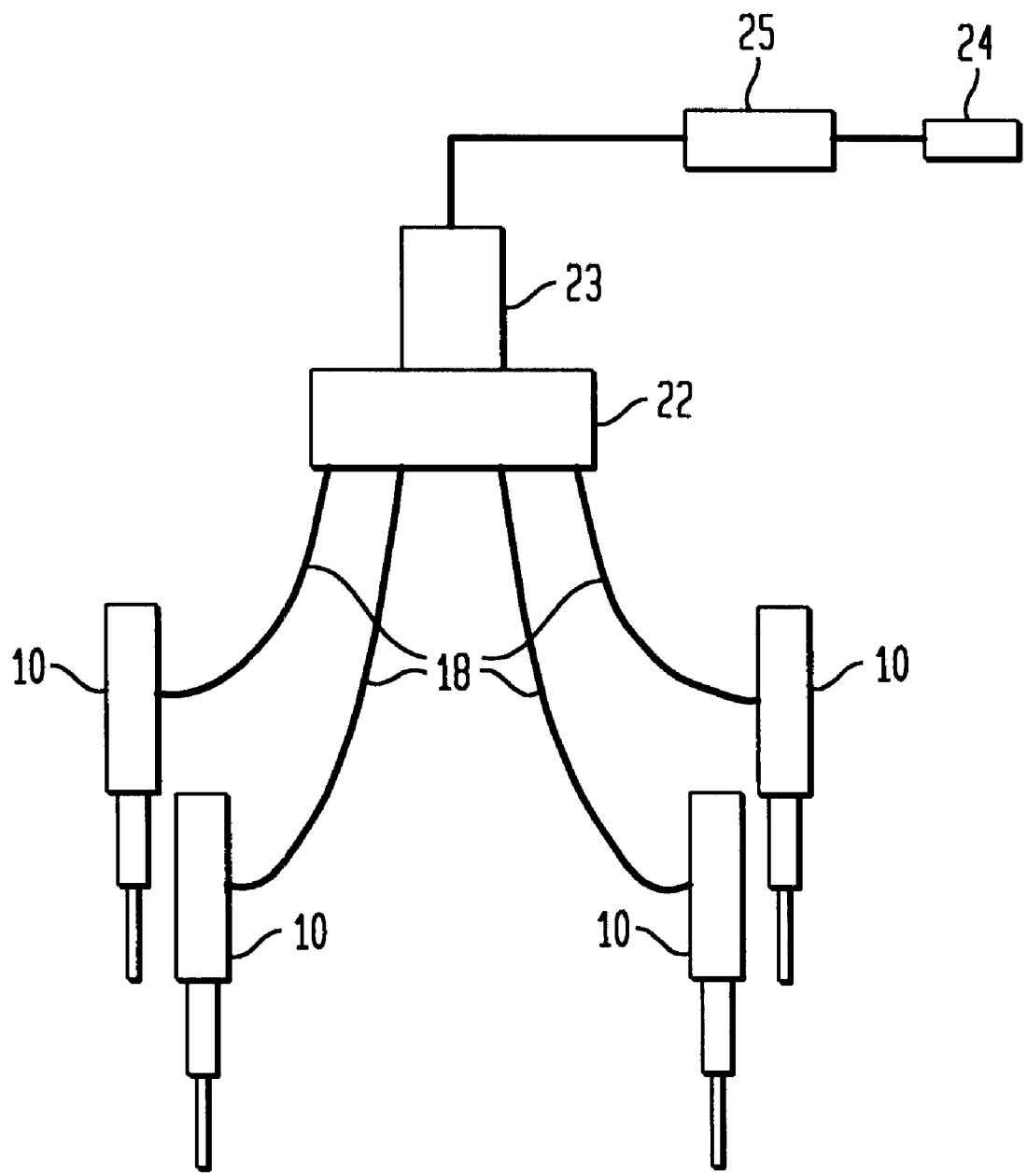
FIG. 4 is an exemplified schematic illustration of a drive assembly comprised of a plurality of linear drives according to the present invention.

Referring now to FIG. 4, there is shown an exemplified schematic illustration of a drive assembly comprised of a plurality of linear drives 10 according to the present invention. Each linear drive 10 is driven by an adjustable drive element 18. Persons skilled in the art will understand that the configuration of the drive assembly of FIG. 4 is illustrated by way of example only, and other configurations are certainly within the scope of the present invention, i.e. the number of linear drives 10 as well as a relative disposition of the linear drives 10 can be suited to any situation at hand.

The drive elements 18 of the linear drives 10 are operatively connected to a transfer case 22 which is driven by a motor 23. Activation of the motor 23 is implemented by a manually-operated hand switch 24 via a control unit 25. Operation and structure of such hand switch 24 and control unit 25 are generally known to the artisan and not described in more detail for sake of simplicity.

Of course, the provision of several transfer cases 22 should be considered within the scope of the invention as well, to which the drive elements 18 may be connected, whereby each transfer case 22 has its own motor 23, for operation of all, or, optionally, less than all linear motors 10. Such a configuration is, for example, appropriate when a piece of furniture has several components that should be individually adjusted by a user, whereby the control unit 25 and the hand switch 24 are accordingly designed.

Figure 7:
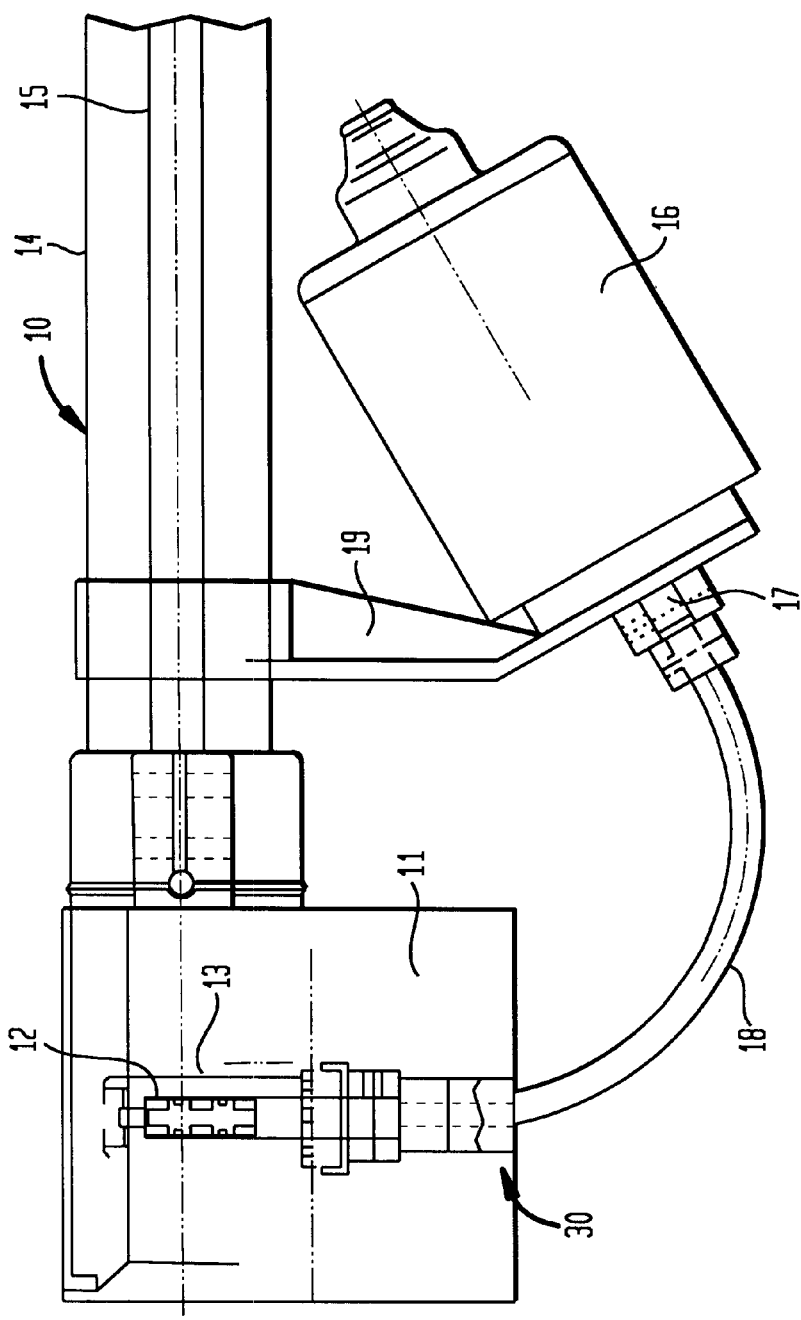
FIG. 7 is a schematic illustration of still another embodiment of a linear drive according to the present invention.

As shown in FIG. 7, the linear drive may also configured with a release clutch 30 for coupling the drive element with the drive motor so that the linear drive can be disengaged.

While the invention has been illustrated and described as embodied in a linear drive, it is not intended to be limited to the details shown since various modifications and structural changes may be made without departing in any way from the spirit of the present invention.

What is claimed as new and desired to be protected by letters patent is set forth in the appended claims.

What is claimed is:

1. A linear drive, comprising:
   at least one spindle;
   drive mechanism, including a drive motor and a reduction gear in driving relationship with the drive motor, for rotatably driving the spindle, said drive mechanism including a drive element having an input member and an output member, whereby the input member is selectively adjustable with respect to the output member;
   a flanged tube; and
   fastening means for securing the drive motor to the flanged tube, wherein the fastening means includes a bracket.

2. The linear drive of claim 1 wherein the drive element is infinitely variable within an adjustment range.

3. The linear drive of claim 1 wherein the drive element is a strand-like, flexible element.

4. The linear drive of claim 1 wherein the drive element includes at least one joint selected from the group consisting of ball-and-socket joint and universal joint.

5. The linear drive of claim 1 wherein the drive mechanism includes at least two of said one drive element.

6. The linear drive of claim 1 wherein the drive motor and the reduction gear are coupled in driving relationship by the drive element.

7. The linear drive of claim 1 wherein the drive motor has a rotor destined for rotation about a rotation axis which extends in parallel relation at a distance to a rotation axis of the spindle.

8. The linear drive of claim 7 wherein the rotation axis of the rotor extends in slanted disposition to the rotation axis of the spindle.

9. The linear drive of claim 1, and further comprising a release clutch for coupling the drive element with the drive motor.

10. The linear drive of claim 3 wherein the strand-like, flexible drive element is formed by a plurality of windings wound from a wire.

11. The linear drive of claim 3 wherein the strand-like, flexible drive element is formed from several layers nested within one another and made from windings of different diameter.

12. A linear drive, comprising:
    at least one spindle; and
    drive mechanism, including a drive motor and a reduction gear in driving relationship with the drive motor, for rotatably driving the spindle, said drive mechanism including a drive element having an input member and an output member, whereby the input member is selectively adjustable with respect to the output member;
    wherein the reduction gear is a worm gear having a worm coupled to the drive element.

13. The linear drive of claim 12, and further comprising a flanged tube; and fastening means for securing the drive motor to the flanged tube.

14. The linear drive of claim 13 wherein the fastening means includes at least two straps.

15. The linear drive of claim 12 wherein the drive element is infinitely variable within an adjustment range.

16. The linear drive of claim 12 wherein the drive element is a strand-like, flexible element.

17. The linear drive of claim 12 wherein the drive element includes at least one joint selected from the group consisting of ball-and-socket joint and universal joint.

18. The linear drive of claim 12 wherein the drive mechanism includes at least two of said one drive element.

19. The linear drive of claim 12 wherein the drive motor and the reduction gear are coupled in driving relationship by the drive element.

20. The linear drive of claim 12 wherein the drive motor has a rotor destined for rotation about a rotation axis which extends in parallel relation at a distance to a rotation axis of the spindle.

21. The linear drive of claim 12, and further comprising a flanged tube; and fastening means for securing the drive motor to the flanged tube.

22. The linear drive of claim 20 wherein the rotation axis of the rotor extends in slanted disposition to the rotation axis of the spindle.

23. The linear drive of claim 12, and further comprising a release clutch for coupling the drive element with the drive motor.

24. The linear drive of claim 16 wherein the strand-like, flexible drive element is formed by a plurality of windings wound from a wire.

25. The linear drive of claim 16 wherein the strand-like, flexible drive element is formed from several layers nested within one another and made from windings of different diameter.

26. In combination:
    a plurality of linear motors, each linear motor comprising at least one spindle, and a drive mechanism, including a drive motor and a reduction gear in driving relationship with the drive motor, for rotatably driving the spindle, with the drive mechanism having a drive element having an input member and an output member, said input member being selectively adjustable with respect to the output member; and
    a transfer case mechanism having several output elements,
    wherein the drive elements of the linear motors are connected to the output elements of the transfer case mechanism.

27. The combination of claim 26 wherein the transfer case mechanism includes one transfer case.

28. The combination of claim 26 wherein the transfer case mechanism includes a plurality of transfer cases.

29. The combination of claim 26, and further comprising a drive motor unit in driving relation with the transfer case mechanism.

30. The combination of claim 29, and further comprising a hand switch and a control unit operatively connected to the hand switch, said drive motor unit being activated by the hand switch via the control unit.

* * * * *